United States Patent [19]
Siegrist

[11] Patent Number: 5,373,919
[45] Date of Patent: Dec. 20, 1994

[54] BRAKE ACTUATOR AND BRAKE PAD

[76] Inventor: Eric Siegrist, R.R. #2, Wiarton, Ontario, Canada, N0H 2T0

[21] Appl. No.: 26,287

[22] Filed: Mar. 4, 1993

Related U.S. Application Data

[63] Continuation-in-part of Ser. No. 853,081, Mar. 17, 1992, Pat. No. 5,293,967, which is a continuation-in-part of Ser. No. 297,133, Jan. 17, 1989, Pat. No. 5,097,927.

[51] Int. Cl.$^5$ ............................................. F16D 53/00
[52] U.S. Cl. ................... 188/76; 188/250 G; 188/71.8; 188/264 R
[58] Field of Search ............... 188/71.8, 73.1, 73.2, 188/76, 196 A, 196 B, 196 C, 196 V, 250 B, 250 D, 250 E, 71.7, 72.2, 342; 192/73, 107 T

[56] References Cited

U.S. PATENT DOCUMENTS

| | | | |
|---|---|---|---|
| 1,935,348 | 11/1933 | Blume | 188/250 G |
| 2,757,970 | 8/1956 | Curell | 188/218 R |
| 2,961,074 | 11/1960 | Oswalt | 188/76 |
| 3,277,983 | 10/1966 | Jeffries | 188/196 P |
| 3,339,683 | 9/1967 | Burnett | 188/196 P |
| 3,357,525 | 12/1967 | Francois | 188/76 |
| 3,605,959 | 9/1969 | Beck | 188/196 P |
| 3,853,207 | 12/1974 | Rist | 188/76 |
| 3,891,069 | 6/1975 | Lawrence | 188/250 G |
| 4,130,186 | 12/1978 | de Gennes | 188/72.4 |

FOREIGN PATENT DOCUMENTS

| | | | |
|---|---|---|---|
| 613540 | 1/1961 | Canada | 188/250 G |
| 1227387 | 12/1959 | France | 188/196 P |
| 939427 | 10/1963 | United Kingdom | 188/71.7 |

*Primary Examiner*—Robert J. Oberleitner
*Assistant Examiner*—Chris Schwartz

[57] ABSTRACT

An improved brake actuator is disclosed that automatically adjusts for brake pad wear, thereby retaining a given retraction space from a fully actuated position. The actuator is hydraulically actuated and the components for positive retraction are housed within the hydraulic actuator, thereby protecting the components from the elements. The brake actuator has particular application for a ring brake having opposed cylindrical braking surfaces. An improved self-locking brake pad is also disclosed.

15 Claims, 8 Drawing Sheets

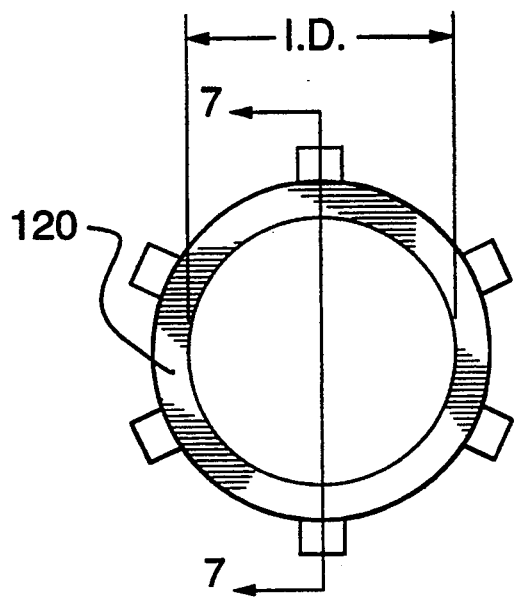
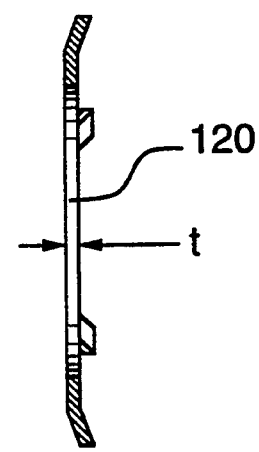
FIG.6.  FIG.7.
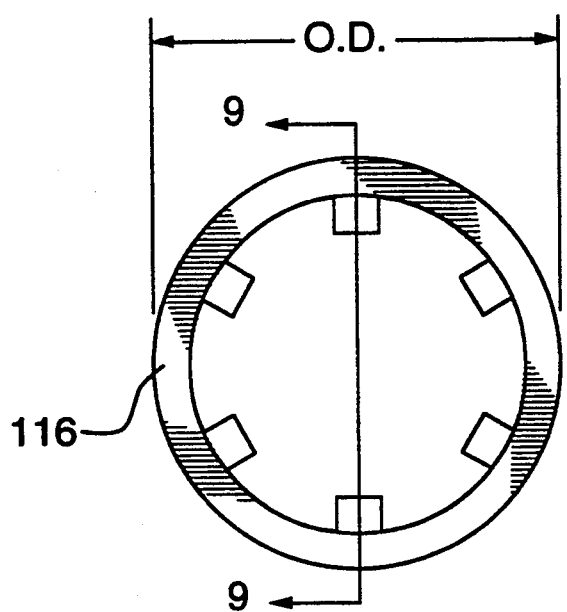
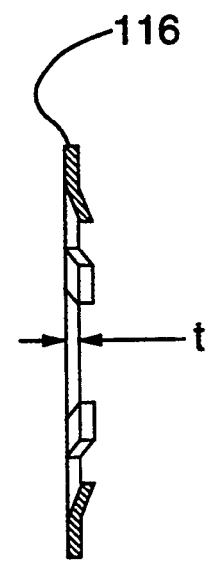
FIG.8.  FIG.9.

5,373,919

BRAKE ACTUATOR AND BRAKE PAD

CROSS-REFERENCE TO RELATED APPLICATIONS

This application is a continuation-in-part of Ser. No. 07/853,081 filed Mar. 71, 1992 now U.S. Pat. No. 5,293,967 which is a continuation-in-part of application Ser. No. 07/297,133 field Jan. 17, 1989 (now U.S. Pat. No. 5,097,927).

FIELD OF THE INVENTION

The present invention relates to vehicle braking systems and in particular to vehicle braking systems and improvements thereto.

BACKGROUND OF THE INVENTION

There are a host of different braking arrangements for vehicles which have been proposed, with the most popular braking system being either the Drum Brake or more recently the Disk Brake. In addition to these two types of braking systems there is also what is referred to as a Ring Brake, as generally shown in U.S. Pat. No. 3,170,542, where braking can occur on both sides of the ring brake member.

Common to all of these braking systems is the dissipation of energy by means of heat which is generated at or on the braking surface. This heat is dissipated to the surrounding air environment by means of convection, however, due to the placement of the brake, generally in a confined region under a vehicle, the circulation of air is relatively poor and the convection coefficient of heat transfer is relatively low. This problem of heat build-up is particularly acute where the brake must be operated frequently over a long period of time and thus, the braking system does not have an opportunity to dissipate the heat when the brake is not in use. Such circumstances-commonly occur with truck braking systems, particularly in mountainess regions, and the possibility of brake failure is quite acute. For example, there are often run-off regions where vehicles that are out of control (i.e. where braking system is substantially lost) may exit into these regions which are designed to stop the vehicle.

Most conventional car braking systems operate satisfactorily, however, braking systems used to maximum, say eight times in a row, often result in the effective braking power being reduced to less than 50%. The principle reason for the reduction in braking power is heat build-up within the braking system.

Another problem associated with vehicle braking systems is in the transmission of the heat generated in the braking system to the wheel bearing of the vehicle. Wheel bearings have generally been protected from transfer of heat from the braking system, as the life of the wheel bearing would be substantially reduced if exposed to the heat generated in the braking system. Therefore, the prior practice has been to isolate the wheel bearing from a direct heat transfer path of the braking surface to the wheel bearing.

Other demanding brake applications include airplanes, trains and race cars. The problem of heat build-up is often compounded in commercial brake applications where shields or other protective members are required to avoid dirt or water maintenance problems. These members further reduce the efficiency of heat transfer to the surrounding air.

In braking systems, brake pads are moved to engage the braking surface and are retracted to disengage the brake. Most disc brakes rely on the rotating disc to "kick back" the pads. It is desirable to have the brake pads retracted to a fully clear position to avoid drag and unnecessary brake pad wear. In ring brakes, the brake pads are larger and a higher retraction amount is desired, preferably about 0.030 of an inch. Retraction distance is also tied to brake pedal travel, both of which can be affected by brake pad wear. It is therefore desirable to have a retraction mechanism which provides this retraction distance and corrects for brake pad wear. The ring brake can use relatively large brake pads to increase the contact area whereby brake pressure can be reduced. Furthermore, speciality high temperature, low wear materials used in disc brakes and racing car brakes are avoided.

Considerable forces trying to strip the brake pads from a retainer are encountered in ring and disc brakes and a simple arrangement for countering a portion of the forces would be desirable.

In ring brakes in particular, there remains a need for a simple brake pad structure as well as a simple brake pad actuating arrangement.

SUMMARY OF THE INVENTION

A set of brake pads designed to engage a cylindrical brake member in an opposed manner, according to the present invention, has one of these brake pads having an arced brake engaging surface for engaging an exterior braking surface with this brake pad having its own exterior surface of a different arc pattern to define a useful brake pad lining thickness between the two surface and thick, generally centrally located, retaining portion. The exterior of the brake pad is adapted to be received and retained in a caliper or brake pad retainer member with the thick portion of the brake pad serving to partially oppose the braking force urging to strip the braking pad from the caliper during application of the brake pads to the braking surface for slowing thereof.

According to a different aspect of the invention, a brake actuator is taught for moving a brake pad or opposed brake pads towards a braking surface. The actuator also moves the brake pad away from the braking surface to a retracted position when the actuator is released. The actuator comprises a piston movable in a cylinder by actuating of driving fluid against the piston, forcing the piston in an actuating direction. A spring bias arrangement urges the piston in a retracting direction opposite to the actuating direction. The piston includes a locking arrangement which displaceably engages the piston in one direction, allowing forced sliding of the locking arrangement relative to the piston when both the piston is moved in the actuating direction and the locking arrangement is positively restrained against movement in the actuating direction. The locking arrangement locks with the piston, restricting movement in the retracting direction of the washer relative to the piston. This locking arrangement freely moves within a capture region, which region is fixed relative to the cylinder. The capture region in combination with the locking arrangement defines the retraction distance of the piston from a fully actuated to a fully retracted position. The locking arrangement slides and locks with the piston when movement of the piston changes to accommodate brake pad wear, such that the distance between the fully actuated and fully retracted position is determined by the extent the locking arrangement moves within the capture region and automatically adjusts for brake pad wear.

BRIEF DESCRIPTION OF THE DRAWINGS

Preferred embodiments of the invention are shown in the drawings, wherein:

FIG. 6 is a plan view of a locking washer;

FIG. 7 is a sectional view of the locking washer of FIG. 6;

FIG. 8 is a plan view of a locking washer with interior directed tabs for engaging a circular type member;

FIG. 9 is a sectional view of the locking washer of FIG. 8;

DETAILED DESCRIPTION OF THE PREFERRED EMBODIMENTS

Figure 1:
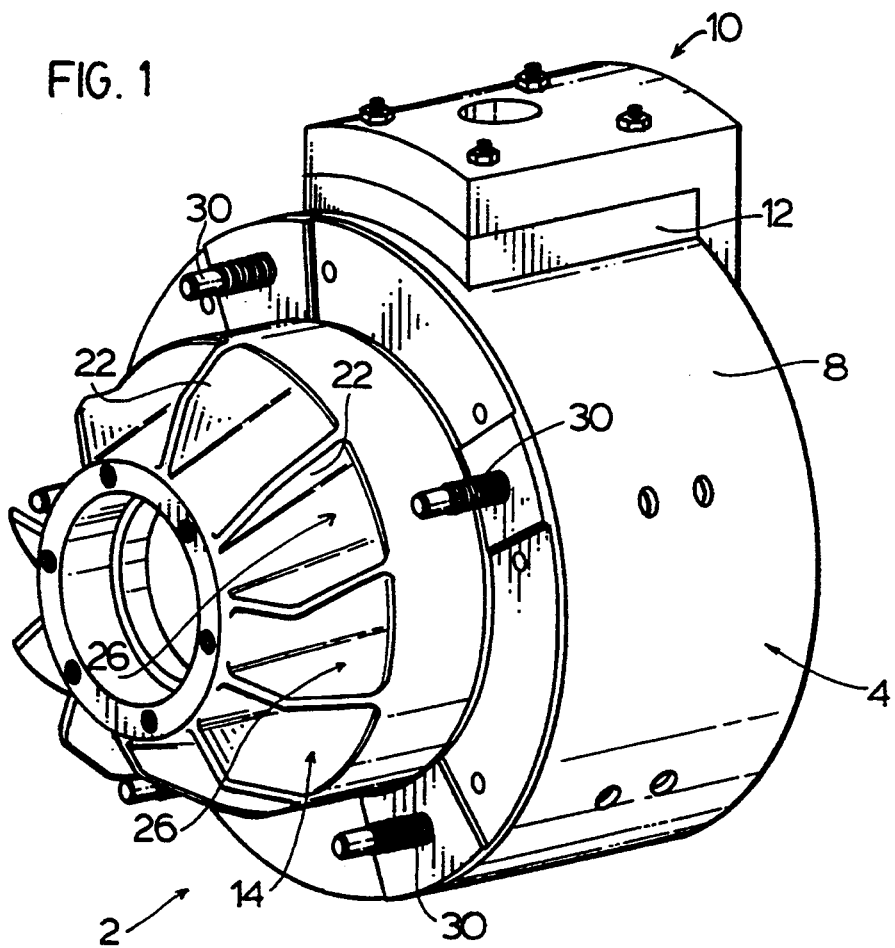
FIG. 1 is a perspective view of the vehicle brake and hub.
Figure 2:
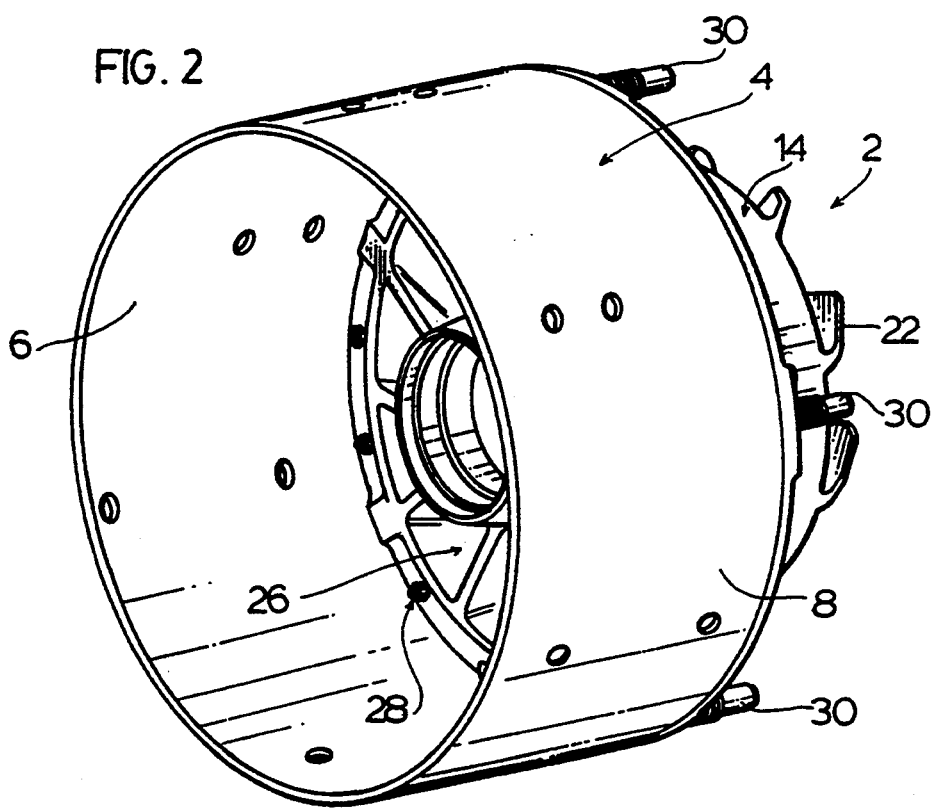
FIG. 2 is a perspective view of the vehicle brake and hub from a different angle.

The vehicle brake and hub is generally shown as 2 in the drawings and comprises a ring braking member 4 having interior braking surface 6 and exterior braking surface 8. The caliper 10 can slide over one end or edge of the braking member to position braking pads 12 directly opposite the braking surfaces 6 and 8.

A cast hub 14 is shown having centrally disposed aligned bearing ports 16 for receiving axle bearings. The cast hub 14 has, at an exterior edge thereof, a securing surface 18 in the form of an annular ring. This securing surface 18 cooperates with the corresponding inwardly directed radial flange 20 of the ring brake member 4. Fan blades 22 form the connection between the outwardly disposed securing surface 18 and the centrally disposed aligned bearing ports 16.

The location of the mating of the radial flange 20 in securing surface 18 is generally intermediate the two bearing ports 16 and as such, heat would have to move outwardly to these bearing ports. Intermediate the fan blades 22 and the securing surface 18 are air conduits 26 which with rotation of the hub produce an air flow, generally indicated as 24, through the air conduits which remove heat from the blades. This heat is removed by convection and is transferred to the forced air flow 24. Securement of the ring brake member 4 to the cast hub 14 is accomplished by means of the nut and bolt arrangement generally shown as 28 in the drawings. In addition, the securing surface 18 includes wheel rim studs, generally shown as 30, by means of which the wheel rim can be secured to the vehicle brake and hub 2.

When heat is generated on the braking surfaces 6 and 8 by means of the braking pads 12 being brought into pressure contact with the braking surfaces 6 and 8, the heat can be dissipated from the ring brake member 4 by means of conduction through the ring braking member into the cast hub 14. The cast hub 14 acts as a heat sink to receive the heat from the ring braking member 4. Heat received by the cast hub will be transferred to the remaining portion of the cast hub and will tend to migrate towards the bearing ports 16, however, with rotation of a hub, the air flow 24 flows over the fan blades 22 and over the bearing ports 16 whereby heat can be removed from the cast hub member by means of forced convection. It has been found that it is beneficial to provide an efficient thermal transfer from the ring braking member 4 to the cast hub 14, even though this cast hub will be associated with the wheel axle bearing. It is more efficient to provide this excellent heat transfer which will allow the ring brake member to perform more consistently and more dependably and to provide an efficient means for dissipating the heat load resulting from the braking by transferring it to the air flow forced through the hub. The air flow also serves to maintain the bearing at a cool operating temperature in spite of the fact that the cast hub acts as a heat sink for the ring braking member 4.

Figure 3:
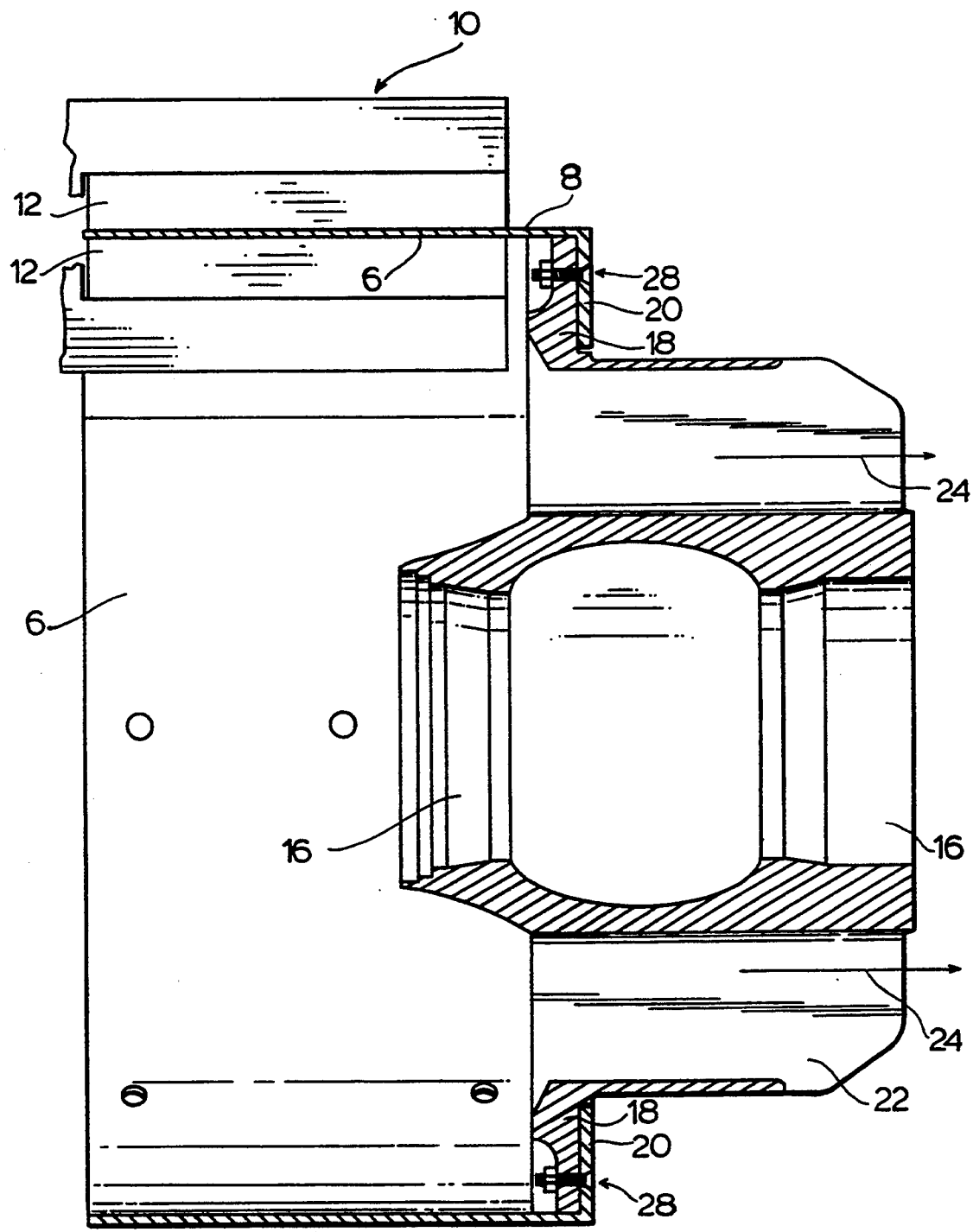
FIG. 3 is a sectional view through the hub of FIG. 2.
Figure 4:
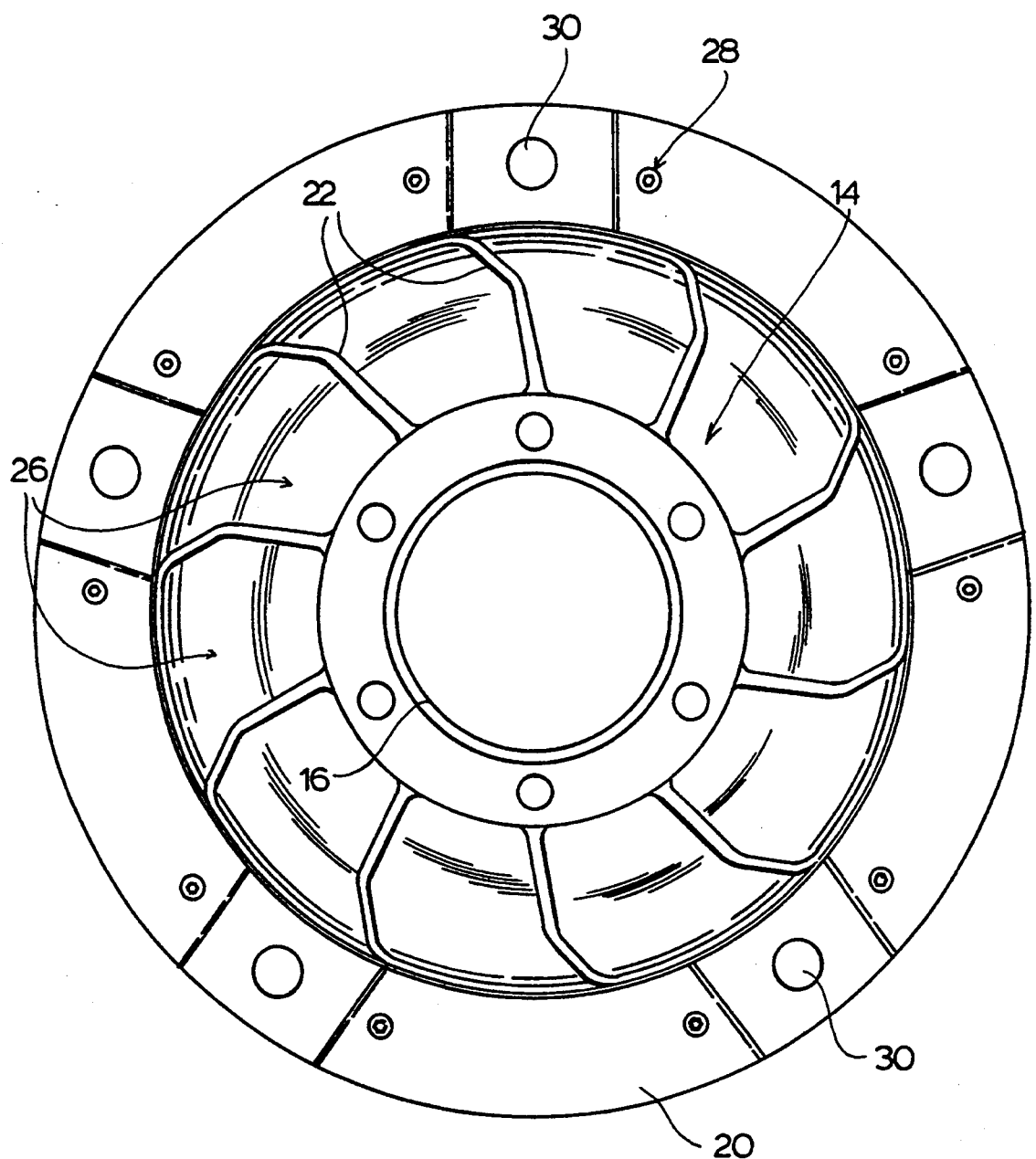
FIG. 4 is a plan view of the cast hub and ring brake.

In considering assembly of the vehicle brake and hub, it can be appreciated from FIG. 3 that the ring braking member 4 can be sleeved over the cast hub 14 to bring flange 20 into abutting contact with securing surface 18. At this point, the nut and bolt arrangements 28 can secure the two components. This arrangement allows each of the separate components of the vehicle brake and hub to be manufactured separately and then assembled in the particular manner described. This particular brake and hub is suitable for many applications from stock cars to large vehicle brakes used, for example, in trucks which require a large braking surface due to the relatively large loads. As can be appreciated, the braking surfaces 4 and 6 are generally at the same distance from the axis of rotation and do not have a decreasing net effect as found in a disc brake. It can also be appreciated that the size of the ring braking surface can be married to the particular braking application and the only limitation to date is in the design of the caliper, generally shown as 10, as the far end of the caliper is effectively cantilever.

The ring brake, as shown in the Figures, has a number of advantages, and in particular, the brake calliper 57 can have large brake pads, for example, the brake pads can be two or more inches with respect to the direction of rotation of the braking surfaces 6 and 8 and can be approximately equal to the depth of the braking surfaces, resulting in a large braking surface at an approximate fixed distance from the wheel axle 11. Because of this large braking area, the pressure exerted on the pads can be relatively low, while still providing a large braking force. It has been found that because of this arrangement, the actual braking pressure is low and this reduces the need, or at least reduces the power, with respect to any power braking system. In most cases, a separate power amplifying arrangement is not required, as the brake pedal and pressure exerted by the user will be sufficient to produce the braking force required to bring the braking pads into effective contact with the braking surfaces and accommodate the necessary braking action. Therefore, with this system, the pressure arrangement for the braking system can be reduced. Furthermore, the calliper 57 can have a large pull-back arrangement whereby the actual brake pads are drawn away from the braking surface to allow essentially free rotation of the braking surfaces 6 and 8 when the driver is not applying any pressure to the brake. This improves gas mileage and also reduces heat generation within the braking system.

The braking surfaces 6 and 8 and the wheel spokes or fan blades 22, as well as the stepped bearing mounting arrangement 23 can be cast as a single unit and a simple bearing arrangement secured thereto for securement on a conventional vehicle. In this way, existing wheel assemblies can be used, allowing the brake to be secured to conventional vehicles. The manufacture of the braking surface and the fan blades is also simplified and the various machining can be accomplished to the single part.

Because of the relatively low pressures exerted by calliper 57 on the braking pads and the large surface of the braking pads, the material of the braking pads can be relatively soft relative to the high temperature, hard materials now common with disc brakes and the very expensive, sophisticated materials used in some race car braking systems. These softer materials are lower priced typically and also have better response over a full operating temperature range. For example, some high strength materials used in disc brakes now do not effectively work when the brake is cold. These materials certainly work satisfactorily once the brakes have been applied several times and the braking system has been heated. It has been found with the present braking arrangement that the need for the sophisticated materials of the braking pads is not required and more traditional, lower priced materials may be used.

Although the fan blades 22 and the braking surfaces 6 and 8 have been shown as a one-piece structure in FIGS. 5 through 7, it can be appreciated that they can be split, if desired, into separate components which are subsequently assembled. It is certainly preferred to make them as a single casting.

Figure 5:
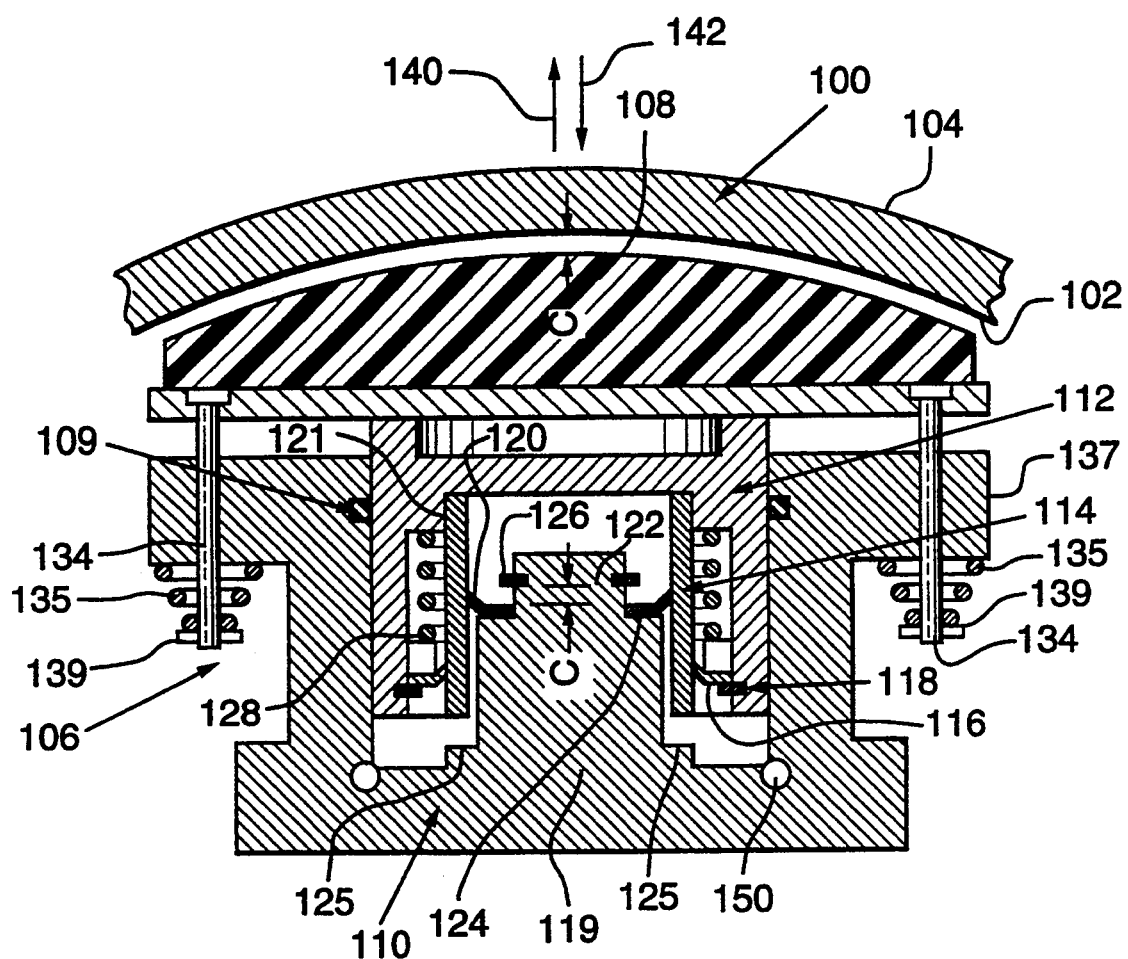
FIG. 5 is a sectional view of a ring brake and brake pad actuating mechanism.

A brake actuator is shown in sectional view in FIG. 5 in relationship to a ring braking member 100. The ring braking member has an interior braking surface 102 and an exterior braking surface 104. In FIG. 5, the brake actuator 106 has been shown for driving the single brake pad 108, however, it can be used in combination with interior and exterior braking pads, as generally shown in FIG. 1. The brake actuator 106 controls the position of the brake pad 108 and causes the brake pad to move to the retracted position of FIG. 5 or the actuated position of FIG. 11. This movement of the brake pad 108 is accomplished by the movable piston 112 which moves within the cylinder 110. The piston 112 has associated therewith a piston sleeve 114. This sleeve is centered within the interior of the piston by the exterior walls of the sleeve being retained by shoulder 121. A one-way washer 116 engages the exterior of the piston sleeve 114 and allows relative movement of the sleeve through washer 116 in the actuating direction shown as 140. The one-way washer 116 is in engagement with the snap ring 118 and is maintained against this snap ring by means of the coil spring 128. Thus, the one-way washer 116 is maintained in a stationary position within the piston 112. The sleeve can be forced through washer 116 until it bottoms out against the piston. The sleeve can be removed by releasing the snap ring 118.

Figure 11:
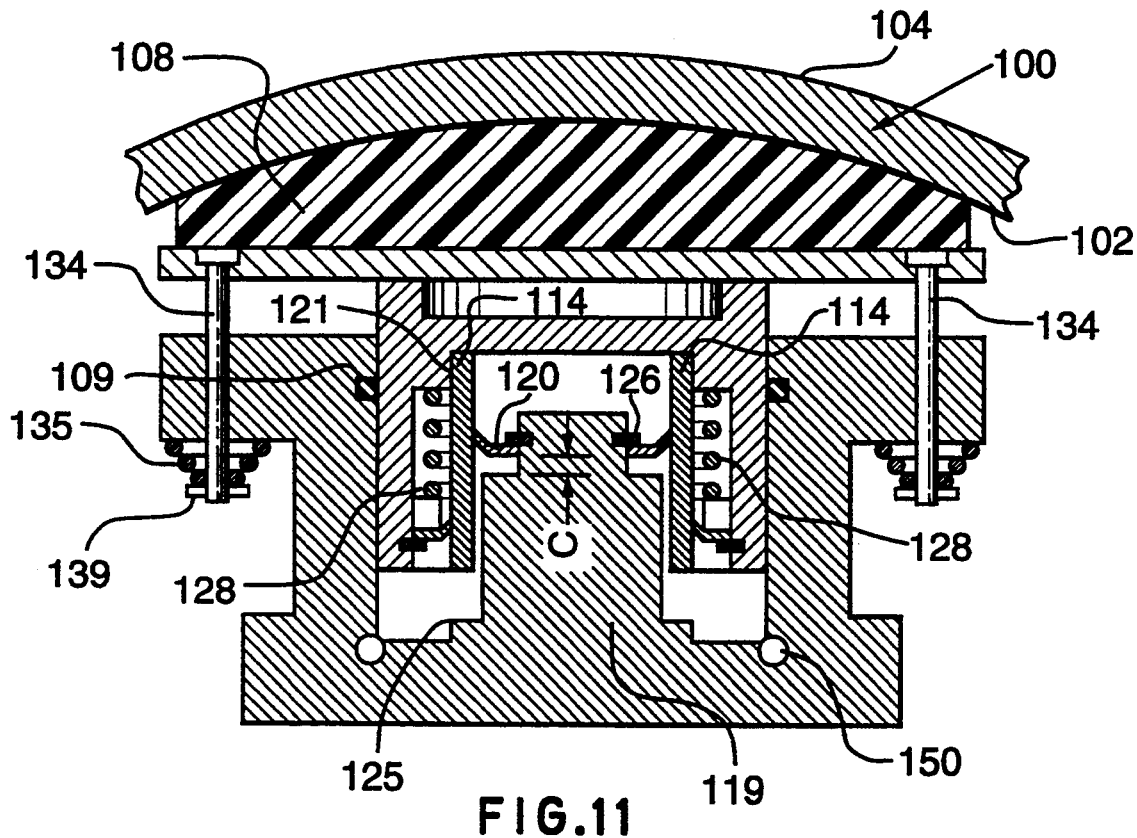
FIG. 11 is a sectional view of the brake actuator with the brake pad fully engaging the braking surface.
Figure 12:
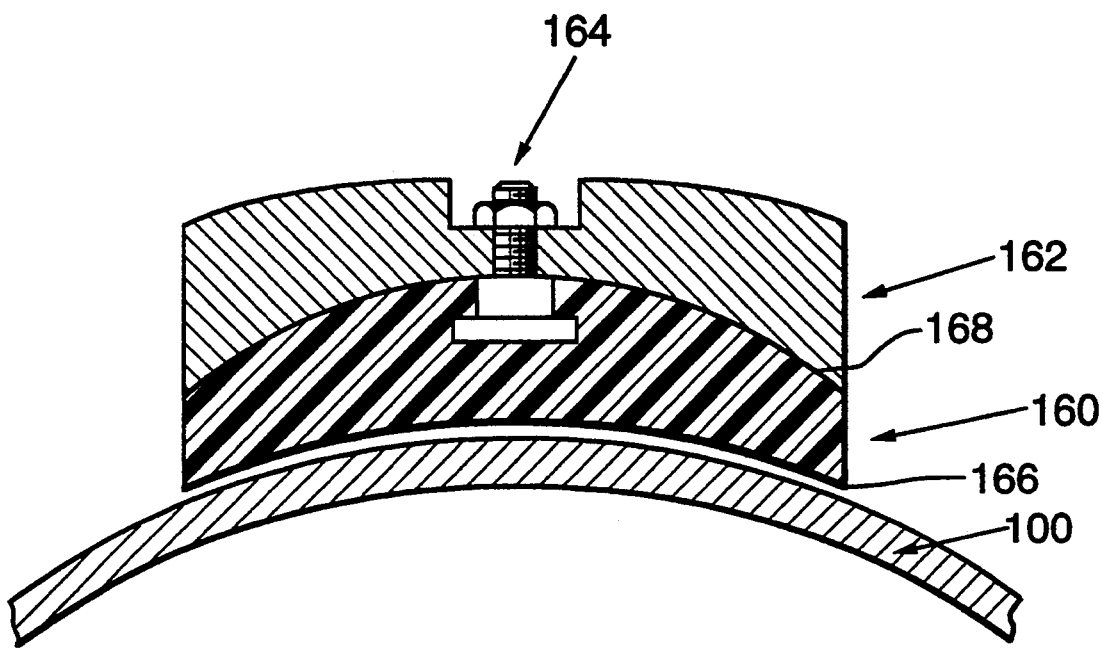
FIG. 12 is a sectional view of a modified brake pad applied to the exterior surface of the braking surface.

The cylinder 110 includes an interior projecting member 119 and has at one end thereof a stub projection 122 located interior to the piston sleeve 114. One-way washer 120 engages the interior wall of the piston sleeve 114 and allows movement therebetween in the retracting direction, generally shown as 142. Thus, if the one-way washer 120 is retained against the snap ring 126, as shown in FIG. 11, further movement of the piston in the actuating direction of the piston is accommodated, as the one-way washer will slide on the interior wall of the piston sleeve 114. This feature accommodates brake pad wear, as will be subsequently described.

A spring bias arrangement 132 includes pins 134 which engage the brake pad with these pin members projecting from the rear of the brake pad or brake pad retainer and have associated therewith return springs 135. These are captured between shoulders 137 of the piston cylinder 110 and a retaining washer 139. The pins 134 also serve to maintain the alignment of the brake pad 108.

To force the piston to an actuated position, fluid is introduced through port 150, and typically this is hydraulic brake fluid. The piston 112 is sealed within the cylinder 110 by means of the O-ring seal, generally shown as 109. Therefore, the piston 112 is forced in the actuating direction 140 by fluid pressure introduced to the cylinder which causes the brake pad 108 to engage the interior braking surface 102.

Figure 10:
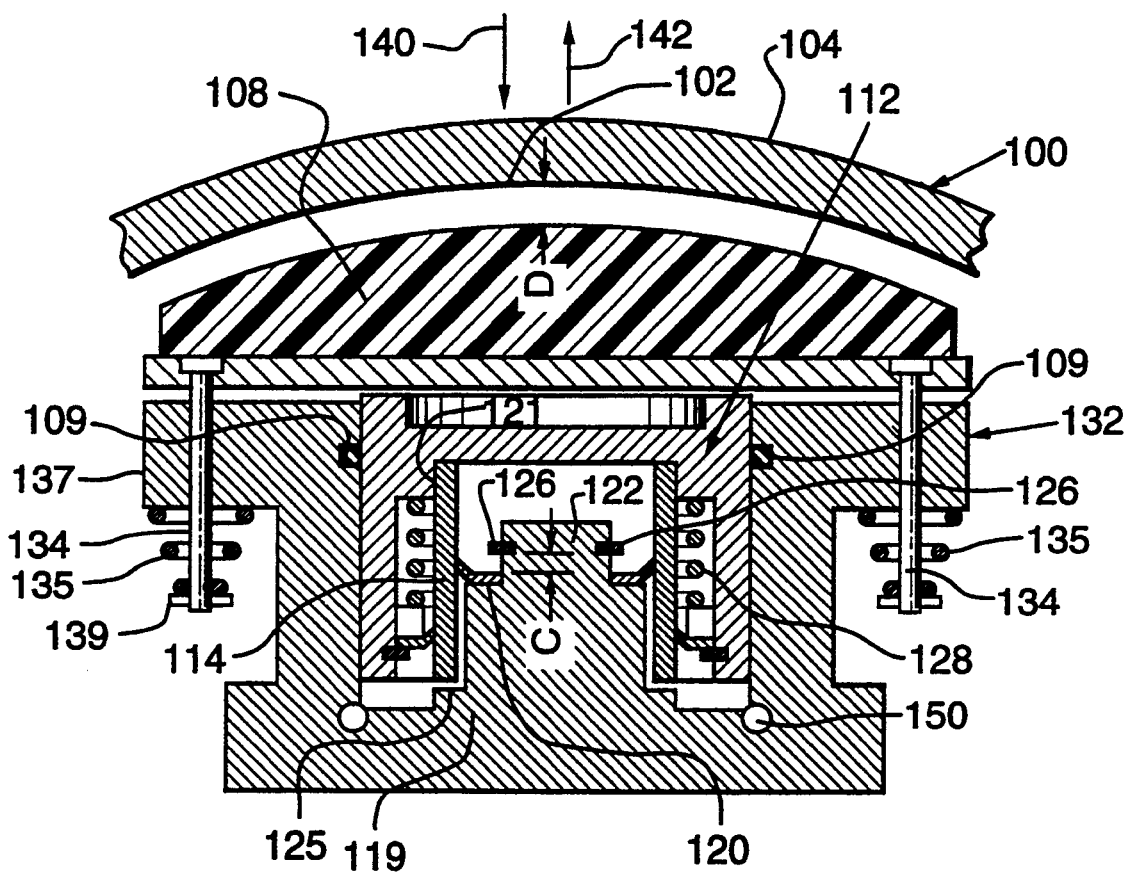
FIG. 10 is a sectional view showing the brake actuating mechanism and pad where the pad is separated from the braking surface by a distance greater than its normal retracting distance.

The distance the brake pad 108 is retracted from the braking surface 102 is determined by the distance C, indicated in the Figures, which is the spacing between stub shoulder 124 and locking washer 120, as indicated in FIG. 11. One-way washer 120 has slid on the piston sleeve 114 any necessary distance once this washer has bottomed out against the snap ring 126. For example, in FIG. 10, the distance D is greater than the distance C and when the brake pad 108 has moved through distance C towards the braking surface 102, the one-way washer 120 will bottom out on the retaining washer 126 fixed on the stub shaft 124. Hydraulic pressure will continue to force the brake pad towards the braking surface until it engages the same and this further movement will cause slippage between one-way washer 120 and the interior wall of the piston sleeve 114. When the fluid pressure is released, the return springs 135 will force the brake pad 108 away from the braking surface 102 until the one-way washer 120 bottoms out on stub shoulders 124. The piston will not back off any further distance, as the one-way washer 120 is now in locking engagement with the interior wall of the piston sleeve 114. Therefore, this arrangement predetermines the retraction distance which is an important feature, particularly for braking pads applied to ring braking members.

The outer one-way washer 116 and its spring arrangement engaging the exterior wall of the piston sleeve 114 is primarily to provide a simple arrangement for locking of the sleeve within the piston. Therefore, the piston sleeve 114 may merely be inserted within the interior of the piston and it is held in this position due to the locking arrangement of the one-way washer 116 and its associated spring mechanisms and snap ring 118. Should it be necessary to remove the sleeve from the piston, the unit can be disassembled and snap ring 118 removed, which then allows the sleeve and one-way washer 116 to be removed from the interior of the piston and this washer may then be removed. This arrangement of one-way washers also allows simple assembly of the units and the spring arrangement associated with one-way washer 116 minimizes tolerance variations and thus ensures that distance C is effectively the retraction distance.

The piston can be removed from the cylinder by removing braking member 100, forcing the piston out of the cylinder by applying fluid pressure thereto. With the piston removed, snap ring 118 can be released and piston sleeve 114 with one-way washer 116 can then be removed from the piston.

This arrangement also simplifies assembly. Assembly of the brake actuator is accomplished by assembling the one-way washer 116 and the snap ring 118 together with the spring arrangement 128 within the piston 112. Thus, the piston sleeve 114 has not yet been located within the piston 112. The sleeve is then located in the cylinder and preferably is held in an appropriate position by shoulders 125. It is then possible to push one-way washer 120 into the sleeve and locate the washer on the stub shaft 122. Snap ring 126 may then be brought into engagement with the stub shaft 122. The piston with one-way washer 116 located therein can then be forced into the cylinder and the one-way washer 116 will slide over the exterior surface of the piston sleeve 114. The piston can bottom out on the piston sleeve 114, and thus, will be accurately retained within the piston. It is then possible to insert the return springs 135 to the exterior of the cylinder.

With this arrangement, the retraction distance of the brake pad from the braking surface automatically adjusts as the brake pad wears. Thus, there is no effective change on brake pedal movement and the operation of the piston actuating the brake pad maintains its clearance or maintains the separation between opposed brake pads with changes in brake pad thickness.

As can be seen from FIGS. 5 through 11, the brake actuator can be made from cylindrical components with the various shoulders and recesses easily machined. This results in a very simple structure.

Figure 13:
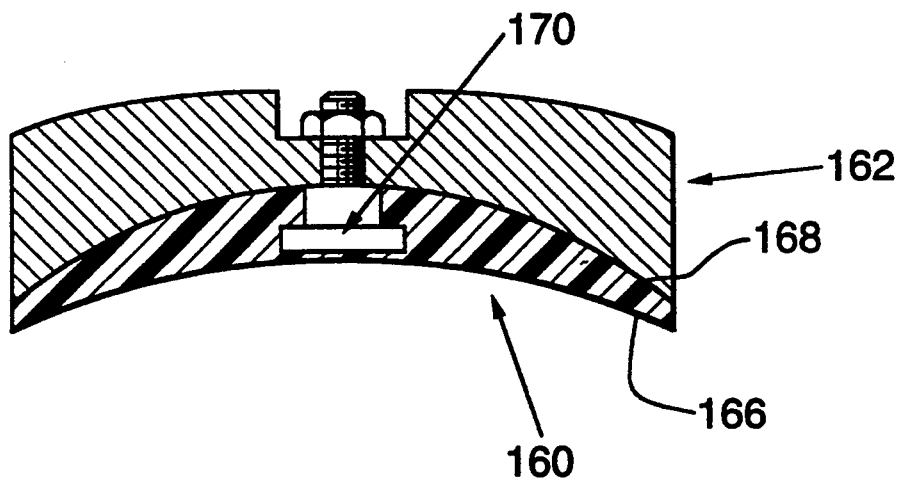
FIG. 13 is a sectional view through a braking pad of the type shown in FIG. 12 which has undergone brake pad wear.
Figure 14:
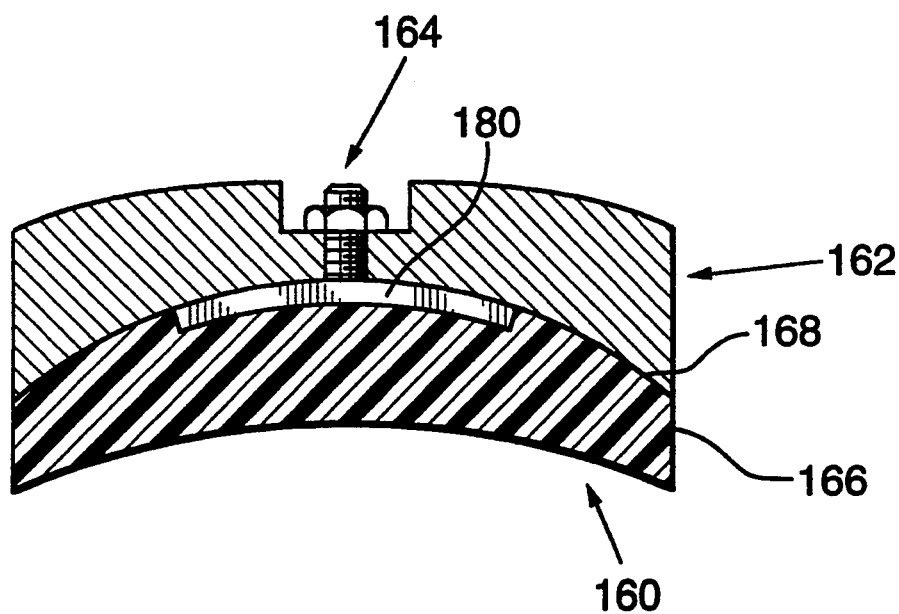
FIG. 14 is a sectional view of a modified brake pad engaged within a retainer.
Figure 15:
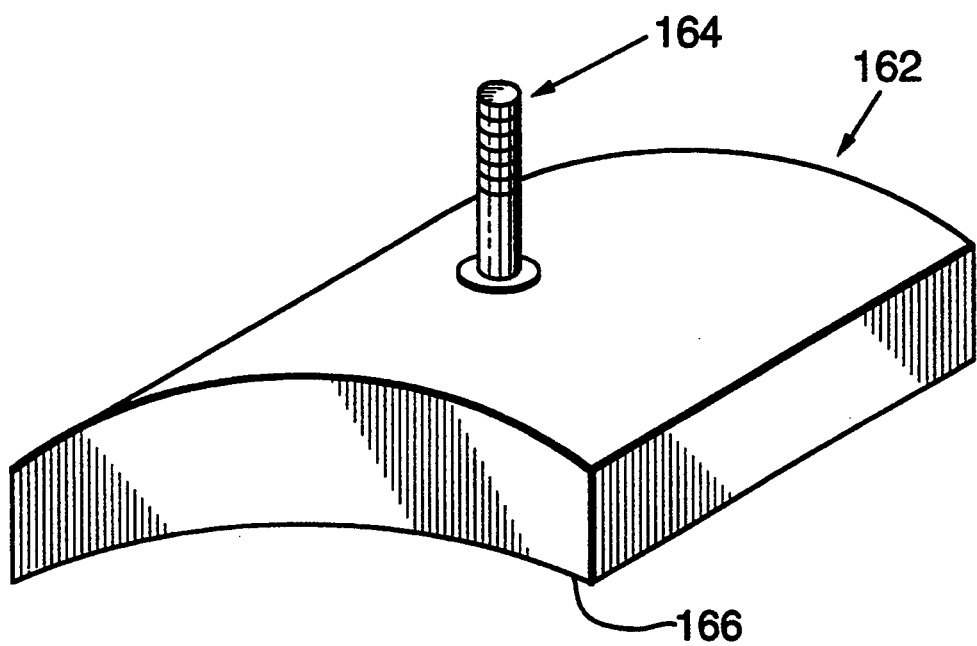
FIG. 15 is a perspective view of the modified brake pad.

A further improvement to a braking arrangement for a ring brake is shown in FIGS. 12 through 15. In this case, an exterior brake pad 160 is shown in engagement with a braking member 100. The brake pad 160 is being held within a brake pad retainer 162 and a mechanical fastener 164 projects from the back of the brake pad and is held by a bolt within a recess of the brake pad retainer 162. As shown in the Figure, the braking surface 166 of the brake pad 160 has an arc which corresponds to the arc of the braking member 100. In contrast, the rear surface 168 is of a substantially lesser arc shape to form a deeper central locking portion which also accommodates the mechanical fastening arrangement 164 without affecting the life of the lining. This point can be appreciated from a review of FIG. 13 where it can be seen that the head 170 of the bolt is still buried within the material of the brake liner, even though this brake pad has undergone substantial wear and is about to be replaced. It can be seen that the end portions are now almost at the brake pad retainer, and therefore, this pad should be replaced shortly. In any event, the life of the pad is such that the head of the mechanical arrangement can be buried directly within the braking material and this head cannot come into contact with the braking member 100. The rear surface 168, because of its lesser arc shape, also serves to retain the braking pad material within the retainer 162. As the brake pad is applied to the braking surface, a shear force is generated which is generally along the surface of the braking member 100. This shearing force is trying to strip the brake pad from the brake pad retainer 162. This stripping action requires all of the brake pad material to try to be forced out of the brake pad retainer, and as the central area is thicker, this would require further compression of the brake pad. Therefore, an automatic locking type engagement is accomplished by having the rear surface of the brake pad of a shape which is deeper than the front surface, such that a locking or binding effect is created when the brake pad is applied to the braking surface. FIG. 13 shows a slightly modified version of the brake pad which includes a larger flanged member 180 which serves to engage the material of the braking pad and allows securement of the braking pad within the braking pad retainer. With the embodiments of FIGS. 12 and 14, the braking pad can easily be manufactured and is easily assembled in the brake pad retainer.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A braking system comprising a ring brake having interior and exterior braking cylindrical surfaces and a set of brake pads which engage said exterior and said interior braking surfaces of said cylindrical ring brake member in an opposed manner, one of said set of brake pads being an exterior brake pad for engaging said exterior braking surface and the other brake pad being an interior brake pad for engaging said interior braking surface, said exterior brake pad having a concave arced brake engaging surface and an exterior mounting surface of a concave arc pattern of a shape to define a useful brake pad lining thickness therebetween and a thick generally centrally:: located retaining portion defined beyond said useful brake lining thickness and bound by said concave arc pattern of said exterior mounting surface, said exterior surface progressively decreasing in thickness, in accordance wit the arc pattern of said exterior mounting surface for a central portion towards each of a leading and a trailed edge of the exterior brake pad; said exterior surface being received and fixed in a corresponding concave portion of a caliper arrangement with said thick portion serving to partially oppose the braking force urging to strip said braking pad from the caliper during application of said brake pads and a brake actuator for causing said brake pads to engage said ring brake member.

2. A braking system as claimed in claim 1 wherein said brake actuator comprises a piston and a cylinder cooperating to define a hydraulic arrangement for controlling movement of said piston in said cylinder in an actuating direction and including bias means for urging said piston in a retracting direction opposite to the actuating direction, said piston when operating in said cylinder including a mechanical locking arrangement within said cylinder which allows movement in the actuating direction and limited movement in the retracting direction to define a maximum retraction distance from a fully actuated position which automatically adjusts for brake pad wear, said mechanical locking arrangement includes a locking washer which cooperates with said piston and cylinder to adjust the position of said locking washer relative to said piston and cylinder during actuation of said actuator and thereby define said maximum retraction distance.

3. A braking system as claimed in claim 2 wherein said locking washer is a one way washer which engages said piston, said one way washer when restrained by said cylinder allowing relative movement of said piston and washer in the actuating direction while locking with said piston in the retracting direction, said washer freely moving in the actuating or retracting direction within a capture region of said cylinder with said capture region restricting movement therebeyond.

4. A braking system as claimed in claim 3 wherein said washer and said capture region cooperate to define the maximum retraction distance.

5. A braking system as claimed in claim 4 wherein said cylinder includes a stud projecting into said cylinder and through the center of said one way washer and includes limiting flanges on said stud either side of the washer to define said capture region on said stud between Said limiting flanges said washer including outwardly projecting tabs which engage the piston and define the one way relationship therewith.

6. A braking system as claimed in claim 5 wherein one of the limiting flanges is a removable snap ring secured on said stud.

7. A braking system as claimed in claim 2 wherein said piston includes a piston sleeve releasably fixed in said piston, said piston sleeve engaging said lock arrangement and allowing for movement of said lock arrangement along the axis of said piston sleeve when required to take into account brake pad wear and thereafter lock with said piston against movement in the opposite direction.

8. A braking system as claimed in claim 1 wherein said exterior brake pad includes a retaining member embedded in said thick portion and extending beyond said exterior surface by means of which said exterior brake pad may be secured in the caliper arrangement.

9. A braking system as claimed in claim 8 wherein said retaining member has a shank which projects outwardly from said exterior surface.

10. A braking system as claimed in claim 9 wherein said shank is threaded.

11. A braking system as claimed in claim 1 wherein said arced portions define said thick portion as being at least about one quarter inch thick at the mid point of said exterior pad.

12. A braking system comprising a ring brake having interior and exterior cylindrical braking surfaces, a set of brake pads with one of said set of brake pads being an exterior brake pad, and one of said brake pads being an interior brake pad with said brake pads being located for respectively engaging said exterior and interior braking surfaces, said exterior brake pad having a concave arced brake engaging surface and an arced exterior mounting surface of a different arc pattern to define a useful brake pad lining thickness therebetween and a thick generally centrally located retaining portion, said thick retaining portion progressively increasing from leading and trailing edge regions respectively of said brake pad towards a center region therebetween, said exterior mounting surface being adapted to be received and retained in a caliper arrangement having a concave mounting surface which corresponds to said exterior mounting surface and receives and supports said exterior mounting surface said retaining portion serving to produce a wedging effect opposing the braking force urging to strip said braking pad from the caliper during application of said brake pads.

13. A braking system as claimed in claim 12 wherein said exterior brake pad includes a retaining member embedded in said thick portion and extending beyond said exterior surface by means of which said exterior brake pad is be secured in the caliper arrangement.

14. A braking system comprising a ring brake having interior and exterior cylindrical braking surfaces, a set of brake pads with one of said set of brake pads being an exterior brake pad and one of said brake pads being an interior brake pad with said brake pads being located for respectively engaging said exterior and interior braking surfaces, said exterior brake pad having a concave arced brake engaging surface and an exterior mounting surface of a different pattern to define a useful brake pad lining thickness therebetween and a thick generally centrally located retaining portion, said thick retaining portion progressively increasing from leading and trailing edge regions respectively of said brake pad towards a center region therebetween, said exterior mounting surface being adapted to be received and retained in a caliper arrangement with said thick retaining portion serving to partially oppose the braking force urging to strip said braking pad from the caliper during application of said brake pads and including a brake actuator for moving opposed brake pads towards a braking surface when actuated and away from the braking surface to a retracted position when said actuator is released, said actuator comprising a piston movable in a cylinder by actuation of driving fluid against said piston forcing said piston in an actuating direction, a spring bias arrangement urging said piston in a retracting direction opposite to said actuating direction, said piston including a locking arrangement located in said driving fluid, said locking arrangement displaceably engages said piston in a first direction allowing forced sliding of said locking arrangement relative to said piston when said piston is moved in the actuating direction and said locking arrangement is positively restrained against movement in the actuating direction, said locking arrangement locking with said piston and does not accommodate movement of said locking arrangement on said piston in a direction opposite to said first direction, said locking arrangement freely moving within a capture region which region is fixed relative to said cylinder, said capture region in combination with the locking arrangement defining the retraction distance of said piston from a fully actuated to a fully retracted position; said locking arrangement sliding and locking with said piston when movement of said piston changes to accommodate brake pad wear such that the distance between the fully actuated and the fully retracted position is determined by the extent the locking arrangement moves within the capture region and automatically adjusts for brake pad wear.

15. A braking system as claimed in claim 14 wherein said locking arrangement includes a one way washer which engages said piston, said one way washer when restrained allowing relative movement of said piston and washer in the actuating direction while locking with said piston in the retracting direction, said washer freely moving in the actuating or retracting direction within a capture region of said cylinder with said capture region restricting movement therebeyond.

* * * * *